United States Patent [19]

Scott et al.

[11] Patent Number: 4,486,658

[45] Date of Patent: Dec. 4, 1984

[54] WATER FLOW WELL LOGGING SONDE AND METHOD OF WATER FLOW SENSING

[75] Inventors: Hubert D. Scott, Katy; Campsey, Alief, both of Tex.

[73] Assignee: Texaco Inc., White Plains, N.Y.

[21] Appl. No.: 403,884

[22] Filed: Jul. 30, 1982

[51] Int. Cl.³ .............................................. G01V 5/10
[52] U.S. Cl. ..................................... 250/268; 250/270
[58] Field of Search ................ 250/268, 270; 166/187

[56] References Cited

U.S. PATENT DOCUMENTS

| | | | |
|---|---|---|---|
| 2,747,100 | 5/1956 | Wyllie et al. | 250/268 |
| 2,935,615 | 5/1960 | True | 250/269 |
| 3,113,455 | 12/1963 | Sloan et al. | 73/155 |
| 3,209,835 | 10/1965 | Bourne, Jr. et al. | 277/34 |
| 3,373,820 | 3/1968 | Robinson, Jr. et al. | 166/187 |
| 3,432,667 | 3/1969 | Caldwell | 250/253 |
| 4,051,368 | 9/1977 | Arnold et al. | 376/162 |
| 4,189,638 | 2/1980 | Arnold | 250/259 |
| 4,233,508 | 11/1980 | Arnold | 250/259 |

Primary Examiner—Janice A. Howell
Assistant Examiner—Constantine Hannaher
Attorney, Agent, or Firm—Robert A. Kulason; Ronald G. Gillespie

[57] ABSTRACT

An improved radioactivity well logging sonde for sensing fluid flow in an earthen formation from a borehole traversing the formation in which the borehole also contains salt water includes a neutron source for irradiating the earthen formation with neutrons and a detector assembly which detects gamma radiation from the earth formation. The sonde also includes circuitry which processes pulses from the detector assembly to be provided uphole by way of a well logging cable. The sonde includes apparatus spatially arranged with the detector assembly which displaces salt water in the borehole so that there is substantially no salt water between the side of the borehole and the detector assembly. The improved well logging sonde also permits vertical fluid flow measurements in an earthen formation as well as the conventional horizontal fluid flow.

10 Claims, 2 Drawing Figures

FIG. 1
FIG. 2
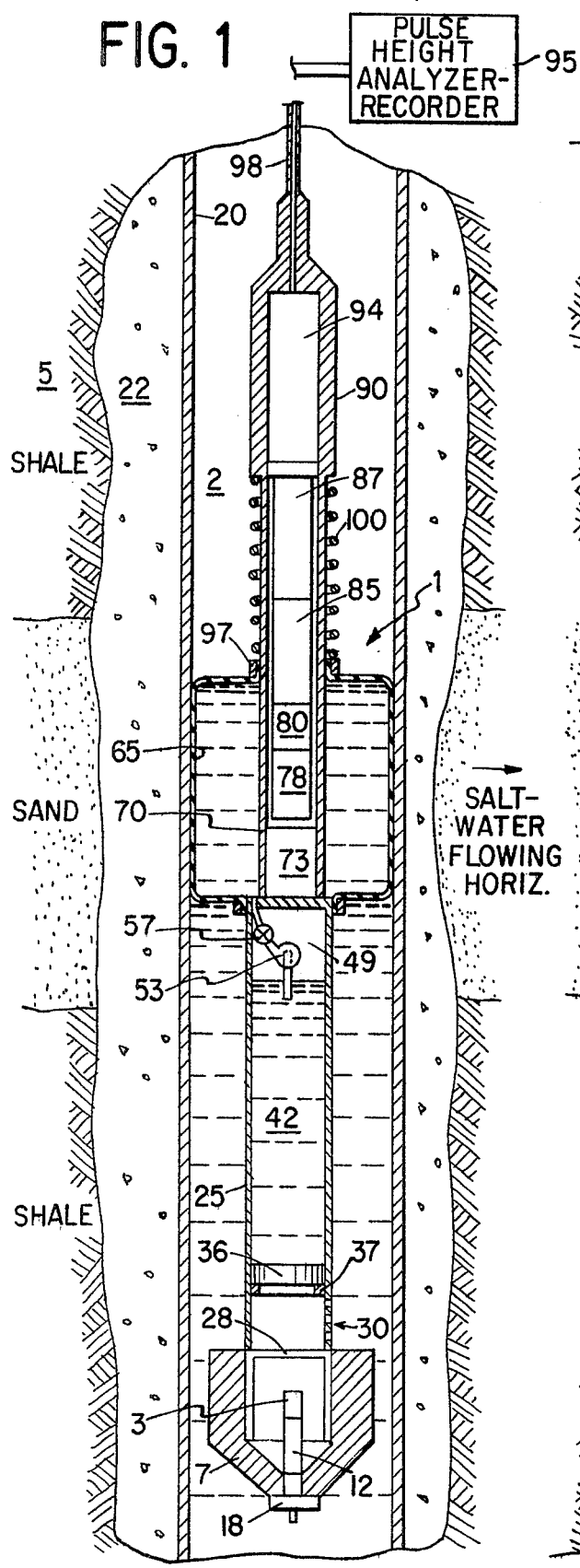
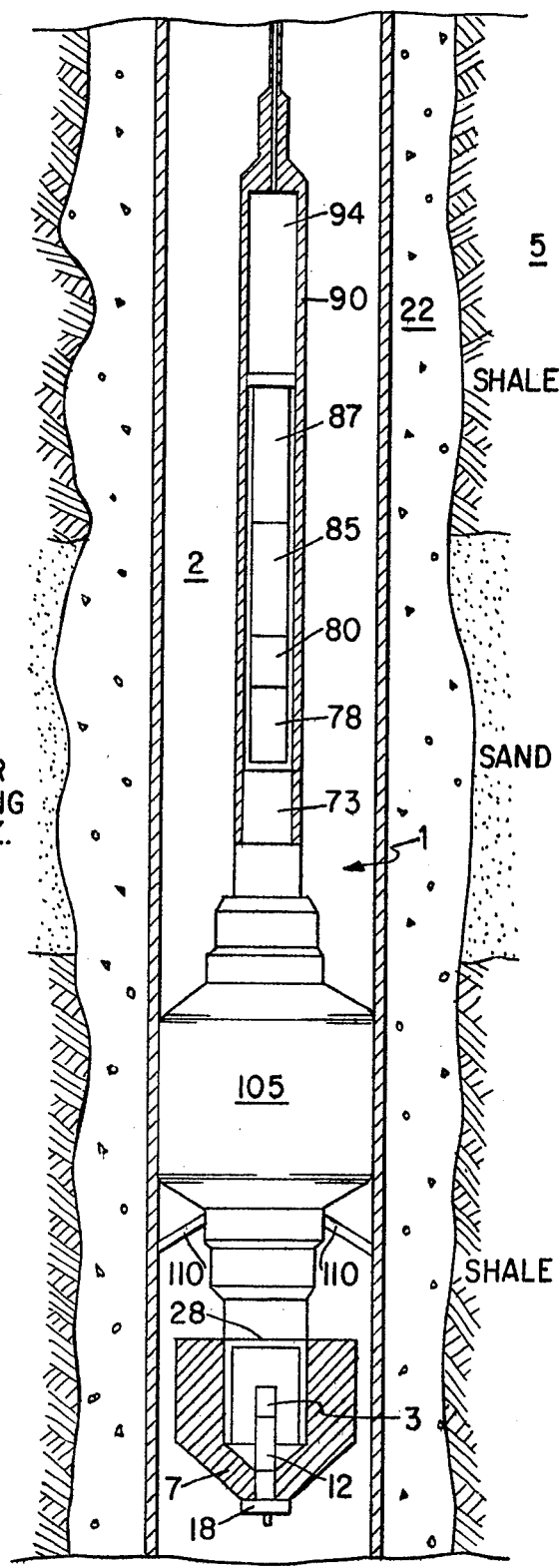

WATER FLOW WELL LOGGING SONDE AND METHOD OF WATER FLOW SENSING

BACKGROUND OF THE INVENTION

Field of The Invention

The present invention relates to well logging apparatus and methods in general and, more particularly, to radioactivity well logging apparatus and methods.

SUMMARY OF THE INVENTION

A radioactivity well logging sonde for sensing fluid flow in an earthen formation from a borehole traversing the earthen formation in which the borehole also contains salt water includes a neutron source for irradiating the earthen formation with neutrons and a detector assembly which detects gamma radiation from the earth formation. The sonde also includes circuitry which processes pulses from the detector assembly to provide them uphole by way of a well logging cable. Apparatus spatially arranged with the detector assembly displaces the salt water in the borehole so that there is substantially no salt water between the side of the borehole and the detector assembly. The improved well logging sonde also permits vertical fluid flow measurements in an earthen formation as well as the conventional horizontal fluid flow.

The objects and advantages of the invention will appear more fully hereinafter from a consideration of a detailed description which follows, taken together with the accompanying drawings wherein two embodiments of the invention are illustrated by way of example. It is to be expressly understood, however, that the drawings are for illustrative purposes only and are not to be construed as defining the limits of the invention.

DESCRIPTION OF THE DRAWINGS

FIGS. 1 and 2 are assembly type drawings of two embodiments of an improved well logging sonde constructed in accordance with the present invention.

DESCRIPTION OF THE INVENTION

The present invention is based on the in-situ creation of radioactive isotopes within the formation fluids in the vicinity of a well borehole. As an example of this the radiation of water in the vicinity of a well borehole with high energy neutron having an energy in excess of approximately 10 MEV can result in the creation of the radiation isotope nitrogen 16 by the nuclear reaction $O^{16}(n,p)N^{16}$. If the formation fluid is saline in nature the radioactive isotope sodium 24 can be produced by radiating the earth formations with neutrons which are slowed to thermal energy and captured by the more common isotope sodium 23 comprising NaCl in solution according to the nuclear reaction $Na^{23}(n,\gamma)Na^{24}$.

If a well logging sonde containing a neutron source is positioned within an earth formation containing water (which is saline in nature) a radioactive sodium isotope is produced in the water which decays by the emission of gamma radiation. If the neutron source is then replaced by a gamma ray detector, a decrease of the gamma radiation in intensity as a function of time can be observed. If the formation fluid is not moving, the observed decrease in activity with time t, will follow the exponential decay $e^{-\lambda t}$ wherein $\lambda$ is the decay constant of the induced radioactivity. If, however, the fluid is moving in a horizontal direction with respect to the gamma ray detector, the observed decrease in activity will be due to the exponential decay characteristic plus an additional decrease caused by the induced radioactivity in the fluid being swept away from the vicinity of the detector by the moving fluid. The observed decrease in the induced activity above the expected exponential decay characteristic can then be used to determine the horizontal linear speed of the moving fluid. All of the foregoing is discussed further in U.S. Pat. No. 4,051,368 assigned to Texaco Inc., assignee of the present invention.

The aforementioned patent does not measure vertical flow. Further, if salt water is also present in the borehole, the borehole salt water will also become activated which results in interference with the measurement. One initial and obvious approach, after the zone of interest has been activated with neutrons from a neutron source for three hours, involves running the logging sonde up and down the borehole to mix non-activated borehole salt water with the activated borehole salt water. However, since the measurement times were about twenty hours per station, the continuous generation of additional activated salt water in the borehole during this measurement period made the results suspect to doubt.

Another obvious approach to eliminate the aforementioned problem required bringing the sonde to the surface and removing the neutron source and then running the sonde back into the well for the twenty hour measurement. The procedure was then reversed and irradiates the next zone and is therefore time consuming and laborious. The present invention is a method and apparatus for measuring vertical fluid flow and to eliminate the borehole sodium interference more efficiently.

With reference to FIG. 1 an improved well logging sonde 1 in a borehole 2 traversing an earth formation 5 includes a neutron source 3 mounted within an aluminum sleeve 7 by way of a fitting 12 affixed to an end plug 18. Borehole 2 has a metal casing 20 with concrete annulus 22.

Sonde 1 also includes a housing 25, affixed to sleeve 7, having an opening 30 with a filter (not shown) that permits the borehole salt water to enter housing 25. A free floating piston 36 initially rests against stops 37 affixed to shell 25. Oil is contained on the other side of piston 36 in a chamber 42. A pump housing 49 includes a pump 53 and a solenoid valve 57 with a connecting channel from chamber 42 through pump 53 through valve 57 to an inflatable packer bag 65.

Affixed to housing 25 is another housing 70 which contains conventional radioactive well logging devices such as shield material 73, a crystal detector 78, a photomultiplier 80, a coolant section 85, which is generally an ice can, and a pre-amp 87. Logging sonde 1 also includes an end section 90 having the electronics package 94 connected to a conventional well logging cable 98 arranged between the end section 90. Electronic package 94 is the same as in the afornentioned U.S. Patent and prepares pulses for transmission uphole. Uphole a pulse height analyzer recorder 95 records the pulses in the conventional manner. A packer spring 100 is against a stop 97.

In operation sonde 1 is placed in position with neutron source 3 opposite a zone of interest such as the sand stratum. Packer bag 65 is inflated by pump 53 pumping oil from chamber 42 through solenoid valve 57 into packer bag 65 causing it to inflate. Packer bag 65 is inflated until it is against the casing of the well. The pressure is sensed by a pressure sensor (not shown) which indicates that inflation has been completed whereupon pump 53 stops pumping and solenoid valve 57 is closed. As oil is pumped out of chamber 42, salt water in the borehole enters through opening 30 so that the salt water being displaced by the inflation of packer bag 65 is accommodated within sonde 1.

Neutron source 3 irradiates for a predetermined time period starting at the time of placing source 3 opposite zone of interest. In one mode of operation this may be approximately one hour. Due to the displacement of borehole salt water by sleeve 7, very little borehole salt water is activated by the neutrons. Detector 78 monitors the gamma rays for a predetermined distance above source 3. One preferred distance is eleven feet. If sodium gamma rays are detected, it is a positive indication of water flowing upwards behind the casing since there is substantially no borehole salt water in the immediate vicinity of detector 78.

Upon completion of the irradiation by neutron source 3, power to solenoid valve 57 is removed and packer spring 100 contracts, thus allowing packer bag 65 to deflate. Sonde 1 is then lowered eleven feet, or the predetermined distance, so that detector 78 is opposite the irradiated zone of interest and packer bag 65 is again inflated so that detector 78 detects the radioactive sodium cloud surrounding the borehole. The measurements of the horizontal water velocity are then determined as noted in the aforementioned patent.

Another embodiment is shown in FIG. 2, with the essential difference being that there is no inflatable packer bag 65 but there is a resettable packer 105 having dogs 110 between source 3 and detector 78. Resettable packer 105 is adjusted until it blocks any salt water within the casing and activated by the neutron source 3 from reaching the detector 78. However, it should be noted that one advantage that the system of FIG. 1 has, is that there is no salt water in the vicinity of the detector 78. With the embodiment of FIG. 2 there will still be salt water around the detector which may be radioactive to some degree.

The present invention as hereinbefore described is an improved radioactivity well logging sonde and well logging methods for measuring formation fluid flow, vertical or horizontal, when there is salt water in the borehole.

What is claimed is:

1. A radioactivity well logging sonde for sensing fluid flow in an earth formation from a borehole traversing said formation wherein said borehole contains salt water, comprising:
   means for irradiating said earthen formation with neutrons,
   detector means for detecting gamma rays from said earthen formation,
   means adapted to be connected to a well logging cable for processing pulses from said detecting means and providing them uphole by way of the well logging cable,
   means spatially arranged with the gamma ray detecting means for displacing the salt water in the borehole in the vicinity of the detector means so that substantially there is no salt water between the side of the borehole and the detector means, and
   second means spatially arranged with the irradiating means for displacing a substantial amount of borehole salt water in the vicinity of the irradiating means so as to minimize the amount of borehole salt water irradiated with neutrons.

2. A well logging sonde as described in claim 1 in which the inflatable means includes:
   a housing having a fluid reservoir not susceptible to activation by radioactivity,
   a free movement piston, an inflatable packer arranged with the housing means,
   means for pumping fluid from the fluid reservoir into the inflatable packer,
   means for permitting some of the displaced salt water to enter the housing in a manner so that the displaced salt water does not enter the fluid reservoir, and
   packer spring means for deflating inflatable packer.

3. A radioactivity well logging sonde for sensing salt water flow in an earthen formation from a borehole traversing said formation wherein said borehole also contains salt water, comprising:
   means for irradiating said earth formation with neutrons,
   detector means for detecting gamma rays from said earthen formation,
   means adapted to be connected to a well logging cable for processing pulses from said detecting means and providing them uphole by way of the well logging cable, and
   means spatially arranged between the irradiating means and the detector means for preventing irradiated borehole salt water from flowing from the irradiating means towards the detector means.

4. A well logging sonde as described in claim 3 in which the preventing means is a resettable packer means for sealing off borehole salt water flow by providing a borehole seal between the irradiating means and the detector means.

5. A well logging sonde as described in claim 4 in which the resettable packer means has a diameter which is adjustable to facilitate movement of the well logging sonde and when necessary to facilitate the sealing of the borehole.

6. A well logging sonde as described in claim 5 further comprising means spatially arranged with the irradiating means for displacing substantial amounts of borehole salt water in the vicinity of the irradiating means so as to minimize the quantity of borehole salt water activated by the irradiating of the earthen formation.

7. A method for determining the location and flow rate of earthen formation fluids moving in a vertical direction past a well borehole, comprising the steps of:
   irradiating the earthen formation in the vicinity of a well borehole with neutrons from a neutron source for a predetermined length of time to neutron activate at least one selected tracer element having a known radioactive half life and comprising a portion of the earth formation fluid moving past the well borehole,
   minimizing the amount of borehole salt water irradiated with neutrons by displacing most of the salt water in the vicinity of the neutron source with a non-expandable device,
   displacing borehole salt water with an inflatable packer located a predetermined distance away from the irradiating location so as to create a displacement zone having substantially no borehole salt water, inflating the inflatable packer with a fluid not susceptible to activation by the neutrons so as to expand the inflatable packer to displace the borehole salt water, detecting gamma radiation from the earth formations with a gamma ray detector located within the inflated packer, and determining the vertical flow rate of the earth's formation fluids in accordance with the detected gamma rays.

8. A method as described in claim 7 in which the displacing step includes encompassing the gamma ray detector with an inflatable packer, and inflating the inflatable packer with a fluid not susceptible to activation by the neutrons so as to expand the inflatable packer to displace the borehole salt water in the vicinity of the gamma ray detector.

9. A method as described in claim 8 further comprising minimizing the amount of borehole salt water irradiated with neutrons by displacing most of the salt water in the vicinity of the neutron source.

10. A method for determining the location and flow rate of earth formation fluids moving in a horizontal direction past a well borehole comprising the steps of:

irradiating the earth formation in the vicinity of a well borehole with neutrons from a neutron source for a predetermined length of time to neutron activate at least one selected tracer element having a known radioactive half life and comprising a portion of the earth formation fluid moving past the well borehole, displacing the borehole salt water where the earth formation was irradiated with neutrons, detecting gamma radiation from the earth formation with a gamma ray detector, located where the borehole salt has been displaced, for two different predetermined time periods, and determining the horizontal flow rate of the earth formation fluids in accordance with the detector gamma rays.

* * * * *